June 12, 1934.   J. B. SINDERSON   1,962,365
HOBBING MACHINE
Filed May 23, 1930   9 Sheets-Sheet 6

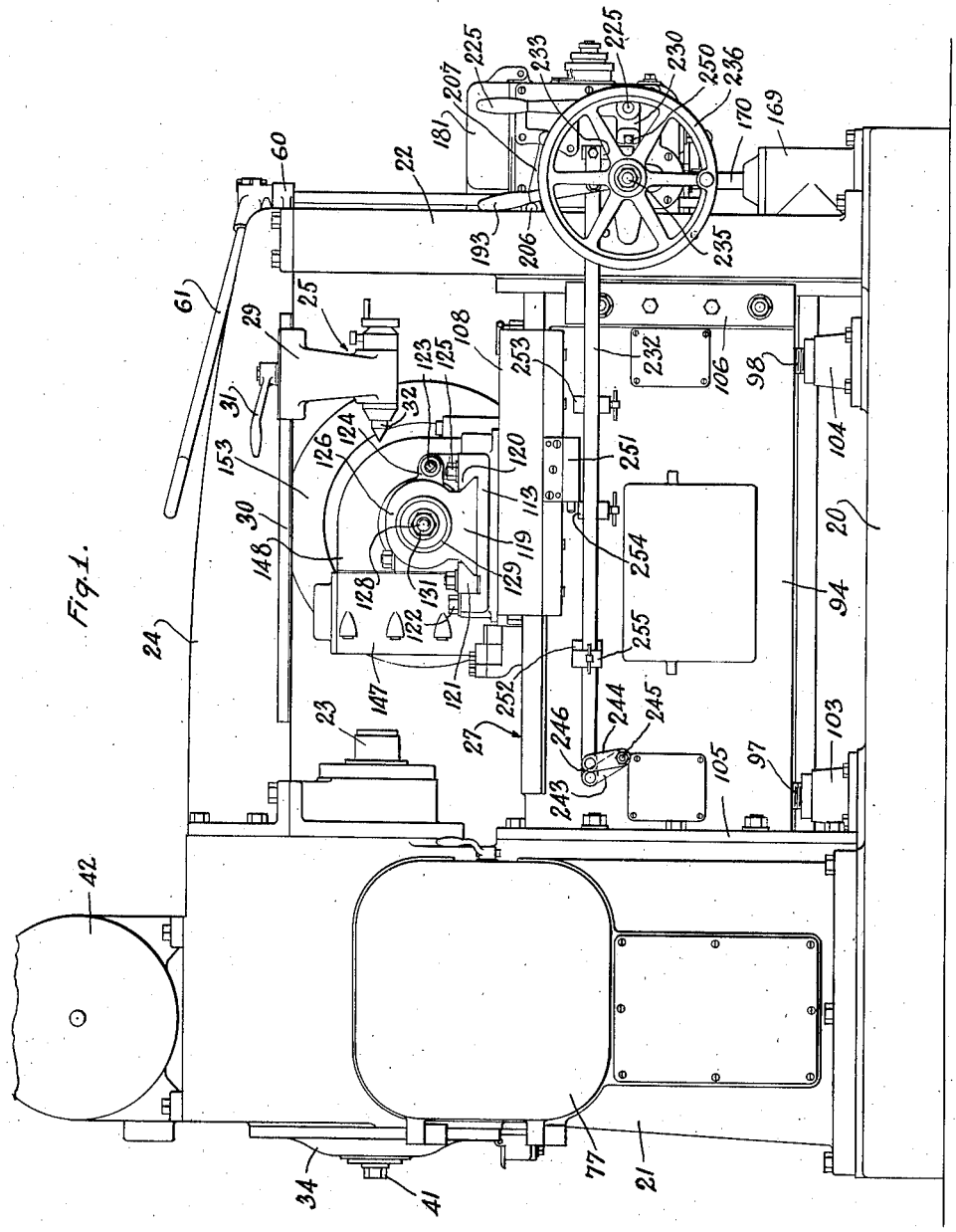

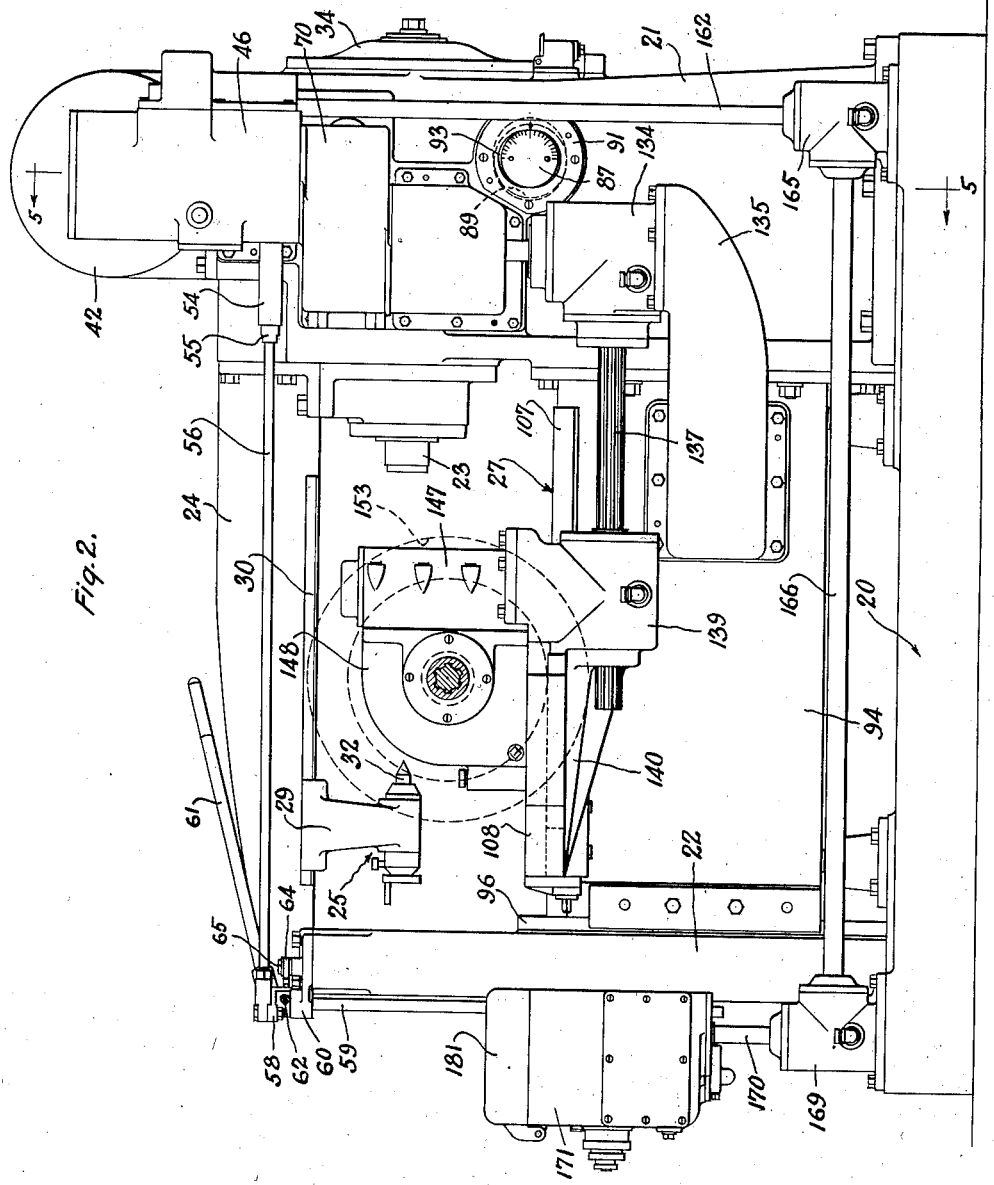

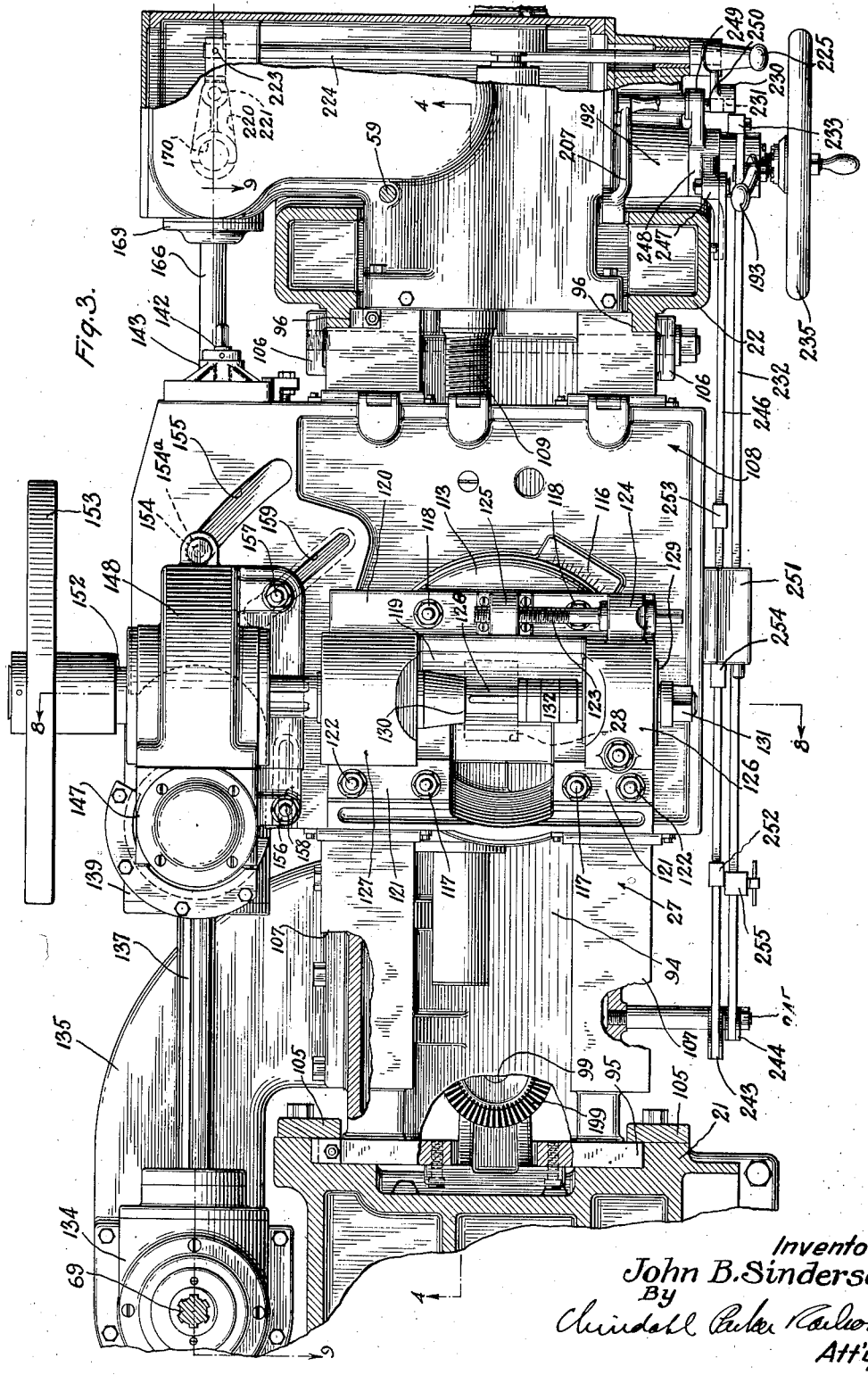

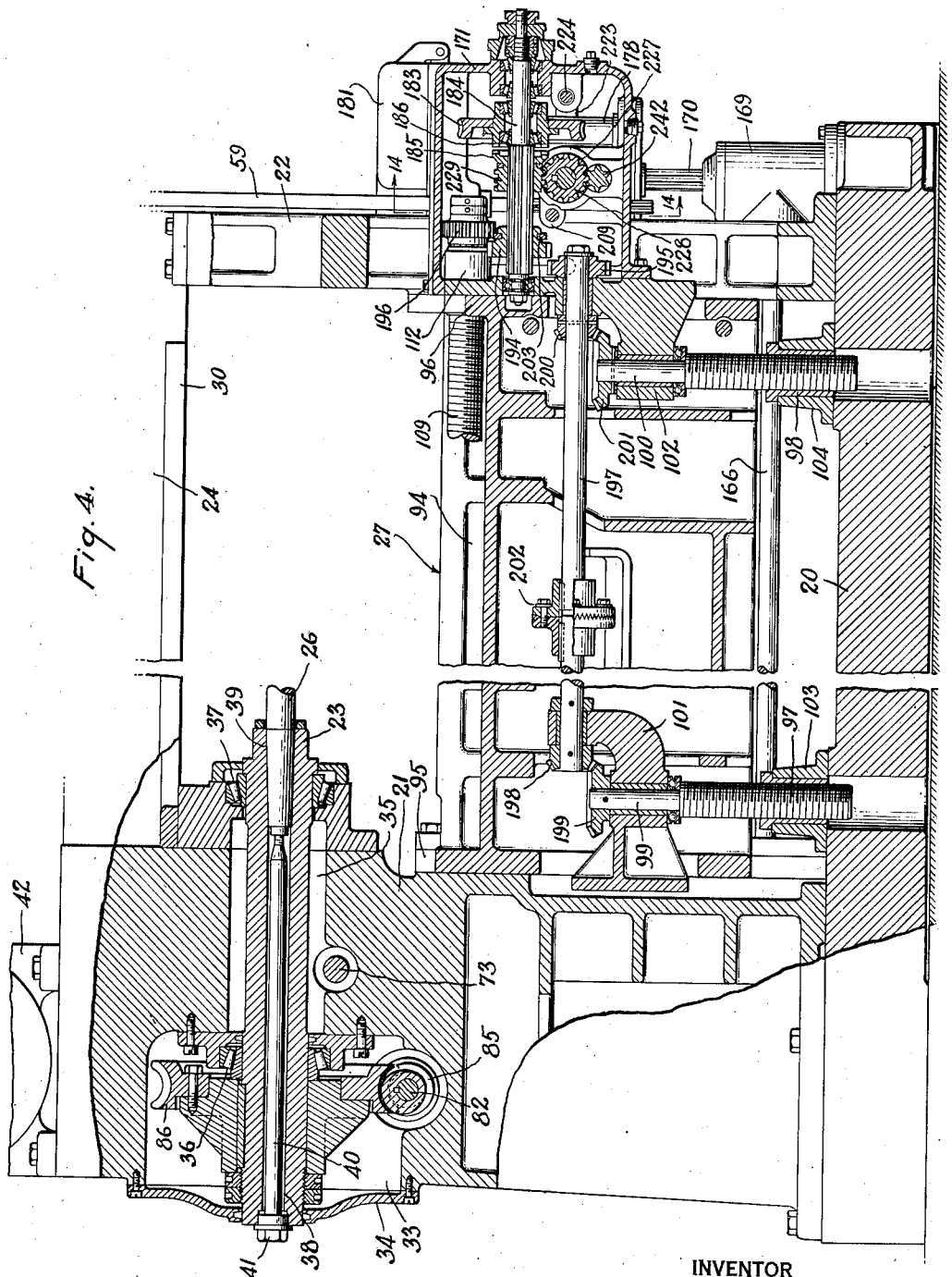

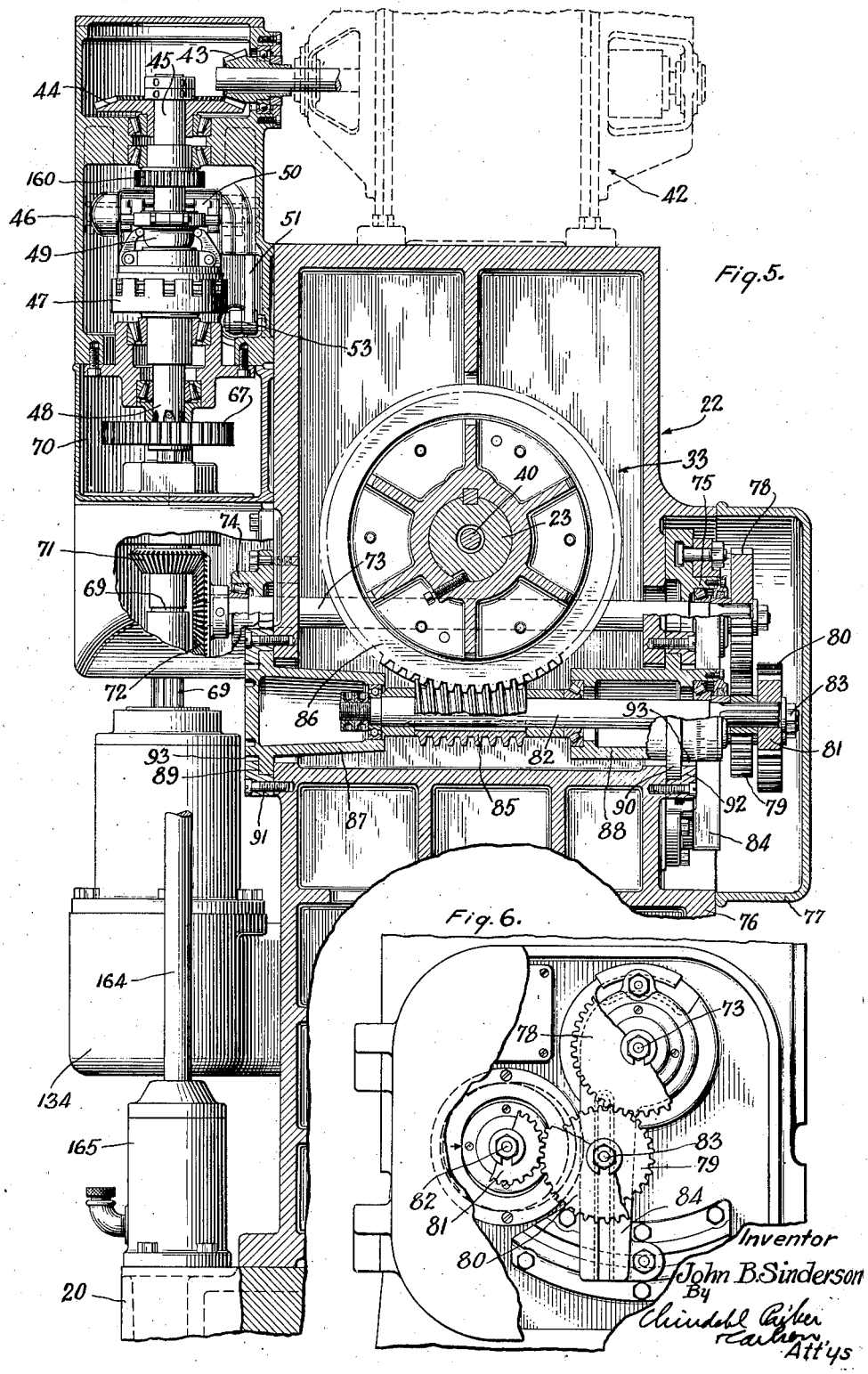

INVENTOR
John B. Sinderson
BY
ATTORNEYS

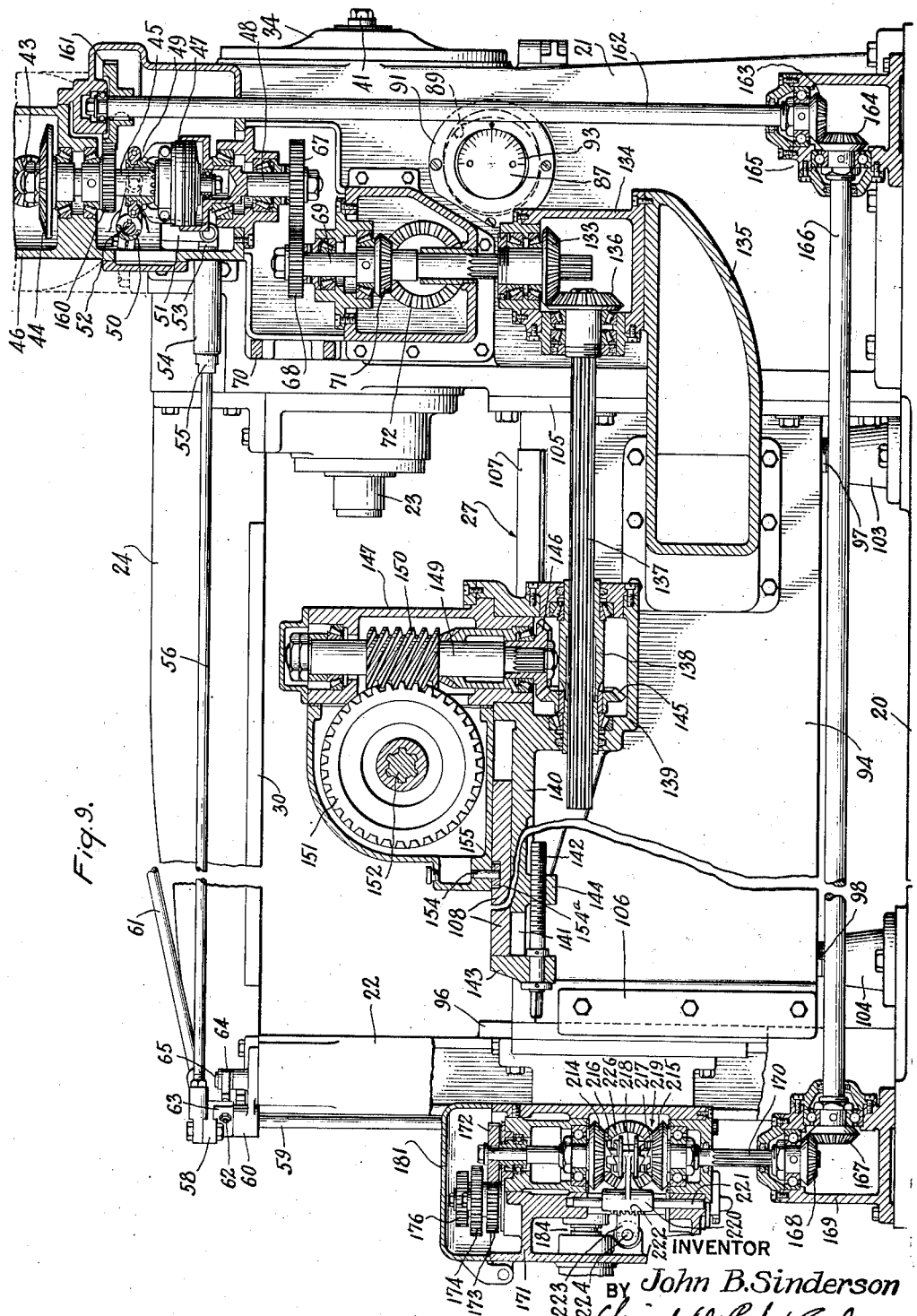

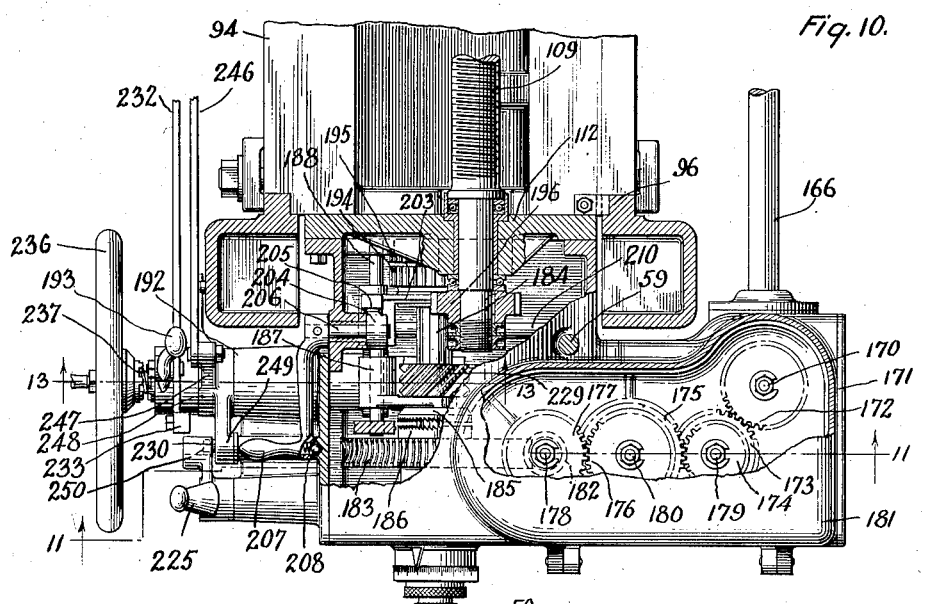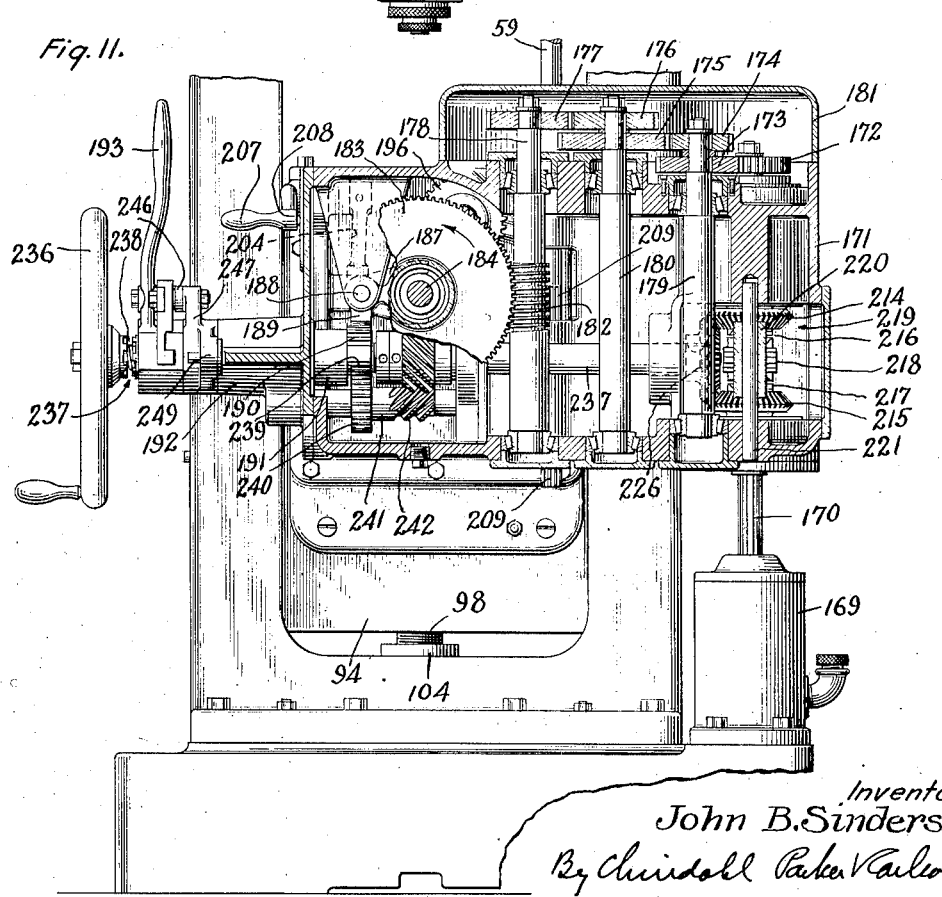

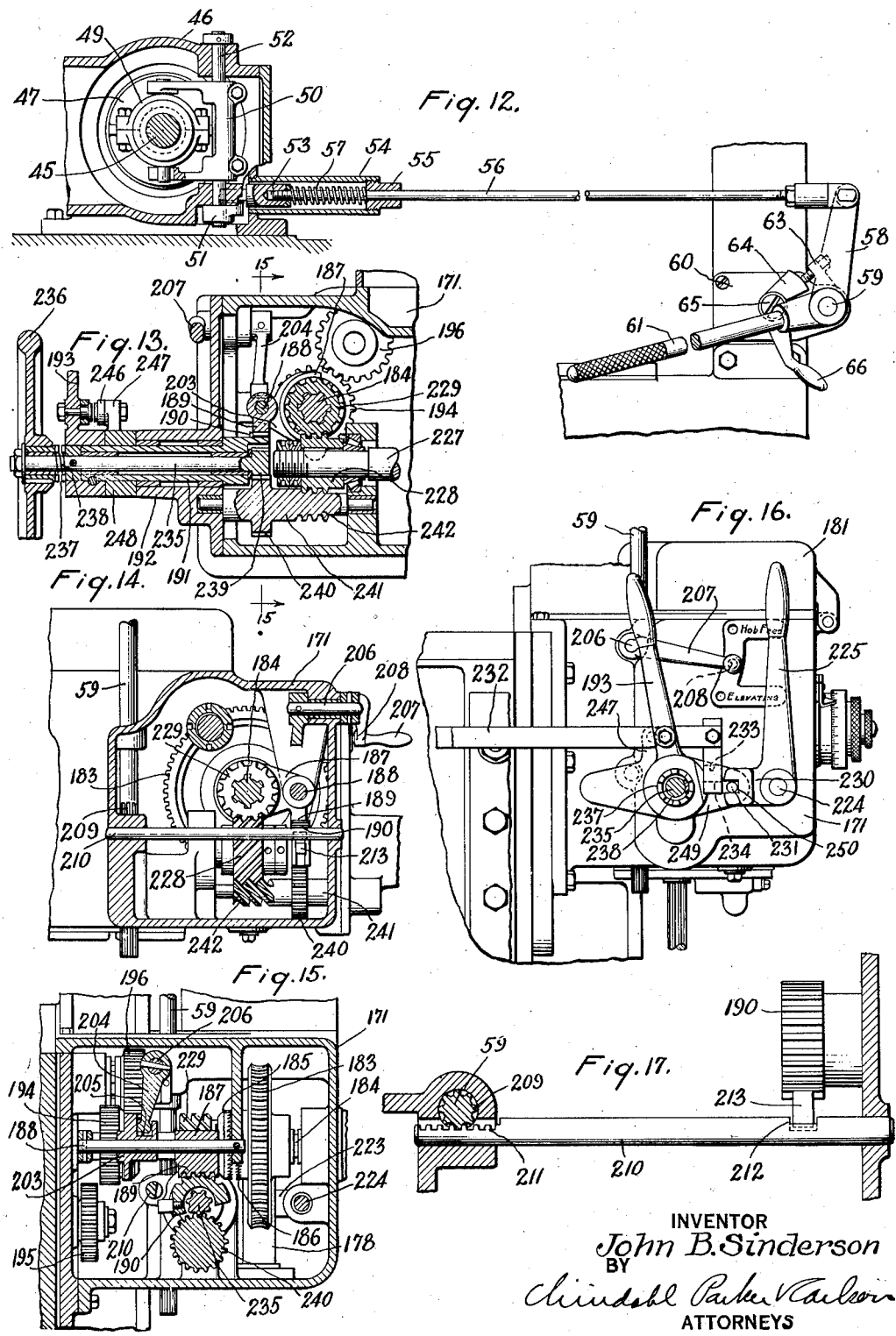

Patented June 12, 1934

1,962,365

UNITED STATES PATENT OFFICE 1,962,365

HOBBING MACHINE

John B. Sinderson, Rockford, Ill., assignor to Barber-Colman Company, Rockford, Ill., a corporation of Illinois Application May 23, 1930, Serial No. 454,908

10 Claims. (Cl. 90—4)

The present invention relates to improvements in hobbing machines, and has particular reference to a new and improved machine for hobbing gears and spline parts.

One of the objects of the present invention is to provide a novel hobbing machine which is capable of producing accurate gears at high speeds, which is strong, rigid and compact in construction, and which is capable of producing gears of large diameter without detrimental vibration or chatter.

Another object resides in the provision of a new and improved horizontal hobbing machine in which the cutter is mounted on a support adapted to be swiveled about a center directly under the cutter axis and substantially midway of the supports for the cutter spindle. As a result, the cutter is not moved off the swivel axis in the swivel adjustment, and hence the supports for the cutter spindle can be located closely together to provide rigidity and to avoid chattering when the cutter enters the work. As a further result, the drive shaft for the cutter spindle need not intersect the swivel axis, but can be located to advantage outside of the ways for the hob slide.

Another important object resides in the provision of a new and improved horizontal hobbing machine in which the cutter is supported on a sturdy carriage movable vertically on and between two opposed columns, and the work is rotatably supported in a fixed vertical position at a minimum distance directly over the cutter.

Further objects and advantages will become apparent as the description proceeds.

In the accompanying drawings, Figure 1 is a front elevational view of a hobbing machine embodying the features of my invention.

Fig. 2 is a rear elevational view of the machine.

Fig. 3 is a fragmentary plan view, partially in section.

Fig. 4 is a fragmentary vertical sectional view taken substantially along line 4—4 of Fig. 3.

Fig. 5 is a fragmentary vertical sectional view through the head end of the machine taken along line 5—5 of Fig. 2.

Fig. 6 is a fragmentary elevational view of a change gear mechanism on the front of the head end of the machine.

Fig. 9 is a vertical sectional view through the machine taken along line 9—9 of Fig. 3.

Fig. 10 is a fragmentary plan view partially in section of the right or tail end of the machine.

Fig. 11 is a fragmentary vertical sectional view taken along line 11—11 of Fig. 10.

Fig. 12 is a fragmentary horizontal view partially in section of one of the clutches and the actuating mechanism therefor.

Fig. 13 is a fragmentary vertical sectional view taken along line 13—13 of Fig. 10.

Fig. 14 is a fragmentary vertical sectional view taken along line 14—14 of Fig. 4.

Fig. 15 is a fragmentary vertical sectional view taken along line 15—15 of Fig. 13.

Fig. 16 is a fragmentary front elevational view of the right or tail end of the machine, showing the clutch actuators for the cutter support.

Fig. 17 is a fragmentary detail sectional view of an interlock between the rotative drive for the work spindle and the cutter spindle and the traverse drive for the cutter.

Figure 7:
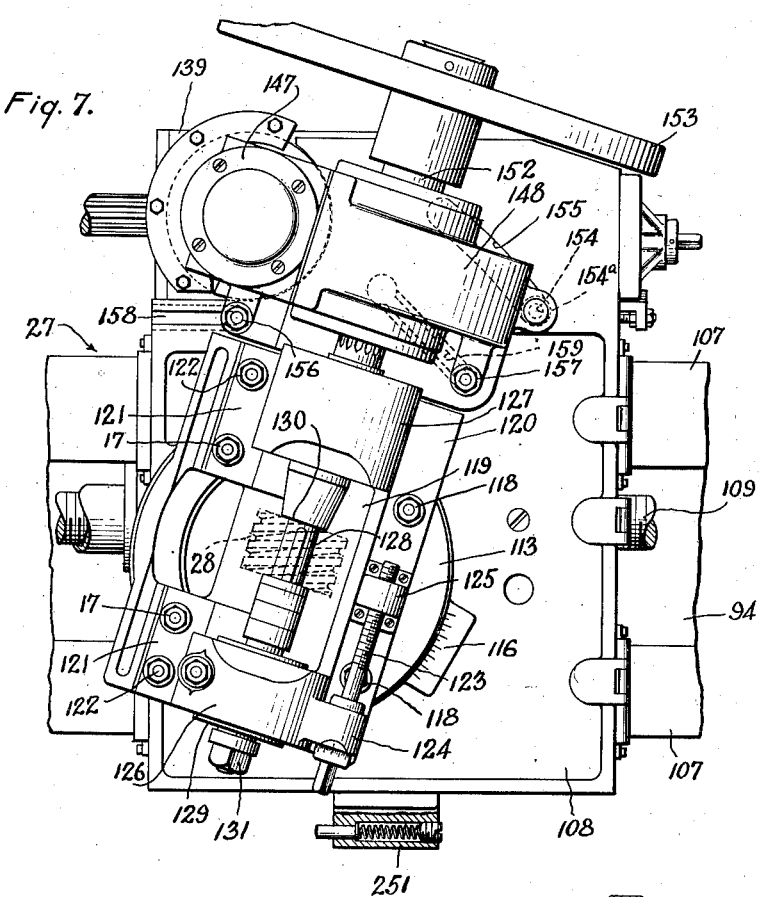
Fig. 7 is a fragmentary plan view of the cutter support.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

Referring more particularly to the drawings, the machine constituting the exemplary embodiment of the invention comprises an elongated floor bed 20. Mounted respectively on the left and right ends of the bed 20 as viewed in Fig. 1 are two parallel upright supports or columns 21 and 22. The column 21 is preferably in the form of a large, sturdy box casting, and the upper end thereof constitutes a fixed headstock for a suitable work spindle 23. The opposite column 22 preferably is a sturdy inverted U-shaped casting. A sturdy horizontal beam 24 extends between and is rigidly secured at its ends to the upper ends of the columns 21 and 22.

Adjustably mounted on the underside of the beam 24 is a suitable suspended tailstock 25 which is adapted to coact with the spindle 23 to support a suitable arbor 26 for a work blank (not shown). A cutter support 27 is mounted for vertical adjustment on the adjacent sides of the columns 21 and 22. In the present instance, the cutter is shown in dotted outline in the form of a hob 28.

Tailstock

The tailstock 25 (see Figs. 1 and 2) comprises a body bracket 29 which is mounted for adjustment toward and from the spindle 23 along a longitudinal dovetailed guide 30 on the underside of the beam 24, and which is adapted to be secured in position of adjustment by suitable clamp means 31. A work center 32 is mounted in the depending end of the bracket 29 in axial alinement with the work spindle 23.

Headstock

The headstock column 21 (see Figs. 4 and 5) is suitably recessed to house and support the work spindle 23 for rotative drive. Preferably, the column 21 is formed in its outer side with a gear chamber 33 which is normally closed by a removable plate 34, and with a bore 35 opening from this chamber to its opposite side. The work spindle 23 extends freely through the bore 35 and the chamber 33, and is journaled in suitable anti-friction bearings 36 and 37 mounted at opposite ends of the bore.

The outer end of the spindle 23 extends through and is rotatable in the plate 34. The spindle 23 is formed from end to end with an axial bore 38, the inner end of which is tapered to constitute a socket 39 for the shank of the work arbor 26. A draw bolt 40 having a head 41 rotatably anchored in the outer end of the spindle 23, extends through the bore 38, and is adapted to be threaded into the inner end of the shank of the arbor 26 to hold the latter securely in place.

Drive for headstock spindle

Power for the headstock spindle 23 is derived from a suitable electric motor 42 (see Fig. 5) mounted on the top of the column 21. The motor shaft is connected through bevel gears 43 and 44 to a vertical drive shaft 45 suitably journaled in the upper end of a sectional gear housing 46 mounted on the rear of the column 21. The shaft 45 is adapted to be connected through a disk clutch 47 to an axially alined shaft 48 also journaled in the housing 46.

The clutch 47 (see Figs. 5, 9 and 12) comprises a shiftable element 49 which is splined to the lower end of the shaft 45, and which is embraced by a clutch yoke 50. Preferably, the latter constitutes one arm of a bell-crank lever 51 which is secured to a pin 52 journaled at its ends in the walls of the housing 46. The other arm of the lever 51 extends downwardly, and is pivotally connected at its lower end to an abutment block 53 movable in a cylinder 54 threaded into one side of the housing 46. The outer end of the cylinder 54 is closed by a plug 55. A horizontal rod 56 is secured at one end to the block 53, and extends from the cylinder 54 through the plug 55 and along the beam 24 to the remote or tail end of the machine. Disposed on the rod 56 in the cylinder 54 in end abutment with the block 53 and the plug 55 is a coil compression spring 57 which tends to open the clutch 47. The outer end of the rod 56 is pivotally connected to a crank arm 58 on a shaft 59 journaled in a bracket 60 on the upper end of the column 22. A hand lever 61 is rigid with the crank arm 58, and extends forwardly and along the top of the beam 24 for actuation from the front of the machine to close the clutch 47.

Suitable means is provided operable at will to hold the clutch 47 in closed position against the action of the spring 57 upon release of the hand lever 61. In the present instance, this means comprises an abutment screw 62 adjustably threaded through a lug 63 on the arm 58, and a pivotal abutment 64 movable into the path of the screw 62 when the clutch 47 is closed. The abutment 64 is mounted on a pivot stud 65 on the column 22, and is formed integral with a hand lever 66 whereby it may be actuated.

The lower end of the shaft 48 is connected through gears 67 and 68 (see Figs. 5 and 9) to the upper end of a parallel vertical shaft 69 journaled in the lower end of the housing 46. A hinged door 70 (see Fig. 2) on the rear wall of the housing 46 provides ready access to permit substitution of the gears 67 and 68 for effecting the desired speed. The shaft 69 is connected through bevel gears 71 and 72 to a horizontal shaft 73 extending through the column 21 to the front of the machine, and suitably journaled in bearings 74 and 75 mounted respectively on the rear and front walls of the column.

The front end of the shaft 73 is connected in a gear housing 76 having a removable cover 77 on the front of the column 21 through speed-change gears 78, 79, 80 and 81 to the front end of a parallel shaft 82 extending rearwardly into the column. The intermediate idler gears 79 and 80 are secured to a stub shaft 83 adjustable along a depending swing arm 84 pivotally mounted at its upper end for adjustment about the axis of the shaft 73. Keyed to the shaft is a drive worm 85 meshing with a worm wheel 86 keyed to and locked on the outer end of the work spindle 23 in the chamber 33.

To provide means for taking up play or backlash resulting from wear in the drive for the work spindle 23, the drive worm 85 is mounted for vertical adjustment. To this end, the opposite ends of the shaft 82 are journaled respectively in concentric bearing supports 87 and 88, and the latter are formed respectively with peripheral eccentric mounting flanges 89 and 90 rotatable in and adapted to be secured by circular flanged collars 91 and 92 to the rear and front walls of the column 21. The central apertures of the collars 91 and 92 snugly engage the sides of the supports 87 and 88, but are enlarged vertically as indicated at 93 to permit the vertical adjustment. In practice, when the machine is new, the worm 85 will mesh snugly with the worm wheel 86 when in its lowermost position of adjustment. As wear occurs, the worm 85 is adjusted upwardly by rotating the supports 87 and 88 which are provided with suitable protractor scales to facilitate like angular settings.

Hob support

The hob support comprises a main carriage or bed 94 (see Figs. 3 and 4) which is mounted for vertical adjustment along guideways 95 and 96 formed respectively in the adjacent inner faces of the columns 21 and 22, and which is supported at its opposite ends by means of two vertical feed screws 97 and 98. In the present instance, the screws 97 and 98 are provided at their upper ends with reduced shaft extensions 99 and 100 rotatably anchored in two bearing brackets 101 and 102 formed within and integral with the carriage 94, and at their lower ends are in threaded engagement with two fixed nuts 103 and 104 on the machine base 20.

Suitable end thrust bearings are interposed between upper shouldered ends of the screws 97 and 98, and the brackets 101 and 102. Gib clamps 105 and 106 are provided for clamping the carriage 94 securely in position of adjustment along the ways 95 and 96. It will be evident that the entire weight of the hob support is carried by the screws 97 and 98, and that the vertical adjustment of the carriage 94 enables the machine to be used for hobbing gears of various diameters without requiring an adjustable work spindle.

The top of the carriage 94 is formed with parallel longitudinal ways 107 on which a hob slide 108 (see Figs. 7 and 8) is gibbed for movement in either direction longitudinally of the work spindle 23. Extending between the ways 107 along the top of the carriage 94 is a suitable feed screw 109 of which one end is in threaded engagement with a fixed nut 110 in a depending lug 111 on the underside of the slide 108, and of which the other end is rotatably anchored in a bearing 112 on the right end of the carriage 94 for connection to the power drive.

Swiveled on the top of the slide 108 is a flat circular table 113. To provide a suitable swivel connection, the table 113 is formed on its underside with a square shouldered circular flange or tongue 114 which extends downwardly into interfitting engagement with a circular T-slot 115 formed in the top of the slide 108. A suitable scale 116 is provided along a portion of the slot 115 to indicate the angular position of the table 113 on the slide 108. Suitable bolts 117 and 118 with their heads disposed in the T-slot are provided for clamping the table 113 in position for adjustment.

A cross slide 119 is mounted on the table 113 for adjustment along a fixed guide 120 and a plurality of opposed clamping guides 121. The latter are adapted to be clamped against the slide 119 by the bolts 117 which also serve to clamp the table 113 to the slide 108. In addition, bolts 122 are provided to clamp the guides 121 securely to the table 113 and against the slide 119. An adjusting screw 123 rotatably anchored in a bearing lug 124 on the front end of the slide 119 and extending rearwardly into threaded engagement with a lug 125 on the fixed guide 120 constitutes the means for adjusting the slide 119 on the table 113 when the various clamping bolts for the guides 120 have been loosened.

Formed respectively on the front and rear ends of the cross slide 119 are two parallel, generally tubular, upstanding lugs or bosses 126 and 127 in which a suitable spindle 128 for the hob 28 is journaled. In the present instance, the spindle 128 is rotatably anchored in suitable anti-friction bearings in the rear boss 127. However, the front end of the spindle 128 is journaled in anti-friction bearings in a cylindrical bearing container 129 removably secured against rotation in the front boss 126. The rear end of the spindle 128 extends from the boss 127 for connection with the power drive.

The hob 28 is adapted to be mounted on the spindle 128 against a shoulder 130 thereon and keyed for rotation therewith, and is clamped in position by means of a nut 131 on the front end of the spindle and acting through the bearing container 129 and a plurality of intermediate spacer rings 132. In removing the hob 28, it is slid off the spindle 128 through the boss 126 after the nut 131, the bearing container 129 and the spacer rings 132 have been removed. The bosses 126 and 127 are so located that the axis of the spindle 128 is located directly over the swivel center of the table 113 so that by adjustment of the screw 123 the center of the hob 28 may be located directly over the swivel center.

The foregoing construction permits the supports for the hob spindle 128 to be located closely together, and also locates the spindle closely to the massive supporting carriage 94, thus providing a sturdy compact construction and eliminating objectionable vibration and chattering when the hob enters the work.

*Drive for hob spindle*

The drive for the hob spindle 128 is taken from the shaft 69 (see Fig. 9) which also is connected to the work spindle 23. Hence, the two spindles are driven in timed relation, this relation being adjustable through substitution in the change-gears 78 to 81 in the work spindle drive, and the speed of both spindles being simultaneously adjustable through substitution in the change-gears 67 and 68 in the joint drive.

The lower end of the shaft 69 extends from the housing 46, and is splined for relative axial movement to the hub of a bevel gear 133 rotatably journaled in a housing 134. The latter is mounted on a sturdy bracket arm 135 secured to the rear side of the vertically movable hob carriage 94 for movement therewith. A second bevel gear 136 in mesh with the gear 133 is rotatably journaled in the housing 134, and is secured to an elongated spline shaft 137 extending horizontally along the rear of the carriage 94.

The free end of the shaft 137 extends through and is splined for relative axial movement to a sleeve 138 rotatably journaled in a depending housing 139. The latter is formed on one end of a slide or tongue 140 adjustably mounted in a longitudinal dovetail guideway 141 formed in the underside of the hob slide 108. The tongue 140 is adjustable on the slide 108 by means of an adjusting screw 142 which is rotatably anchored in a depending bearing bracket 143 on the slide 108, and which extends into threaded engagement with a lug 144 on the underside of the tongue.

A bevel gear 145 is keyed to the sleeve 138 within the housing 139, and meshes with a bevel gear 146 rotatably journaled in the lower end of an upright housing 147 having a section 148 resting on the top of the hob slide 108. The gear 146 is keyed to the lower end of a vertical worm shaft 149 journaled in the housing 147. The lower end of the housing 147 is mounted in the top wall of the housing 139 for swivel adjustment about the axis of the shaft 149. A worm 150 is secured to the shaft 149 and meshes with a worm wheel 151 keyed to a sleeve 152 journaled in the housing section 148. The hob spindle 128 extends through and is splined for relative axial movement to the sleeve 152, and on its rear end carries a suitable fly wheel 153.

Figure 8:
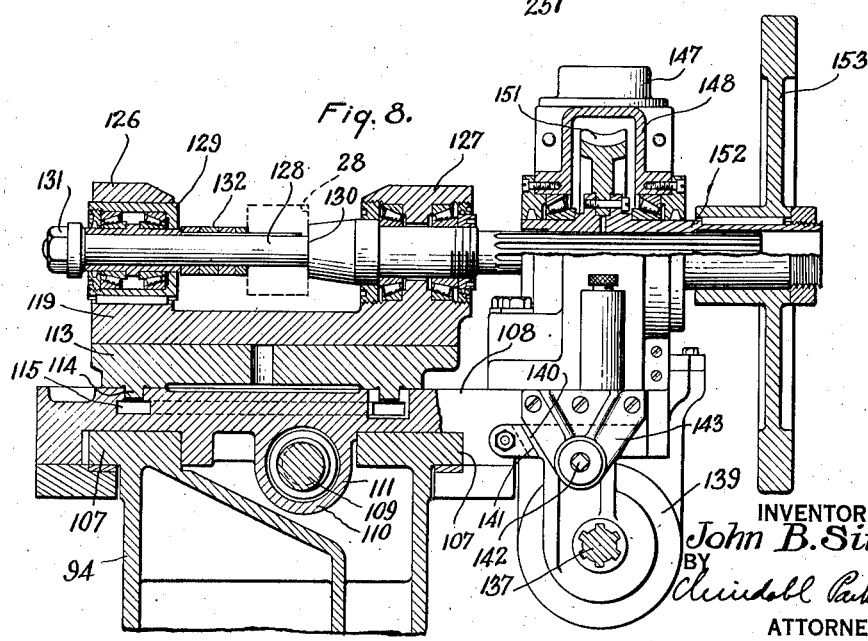
Fig. 8 is a vertical sectional view through the cutter support taken substantially along line 8—8 of Fig. 3.

Angular adjustment of the hob 28 in accordance with its helix angle and also for different types of work, as for example from the position shown in Fig. 3 to that in Fig. 7, is necessary. In effecting such adjustment, the clamping bolts for the table 113 are loosened, and the slide or tongue 140 is then adjusted by actuating the screw 142. The slide 140 acting through the swivel housing 147 and the hob spindle 128 swivels the table 113 to the desired degree, thus imparting a combined linear and swivel movement to the housing 147.

To prevent unnecessary strain on the hob spindle 128 and its bearings while the hob 28 is being adjusted, guide means is provided for the housing 147, this means comprising a pin 154 on the outer end of the housing section 148 carrying a roller 154a which is disposed in a suitably curved slot 155 in the top of the hob slide 108. Suitable clamping bolts 156 and 157 with their heads slidable in suitable T-slots 158 and 159 in the top of the hob slide 108 are provided for securing the housing 147 and the housing section 148 in position of adjustment. After the hob 28 has been angularly adjusted, it is adjusted axially by actuating the screw 123 to locate its center directly over the swivel axis of the table 113.

Drive for hob feeds

Speed adjustable drive means is provided for feeding the hob 28 during the hobbing operation in suitably timed relation to the rotation of the hob and the work blank. In the present instance, this drive means is selectively available to feed either the main carriage 94 upwardly or the hob slide 108 to the left toward the head end of the machine.

The drive means is located mainly at the right or tail end of the machine, and derives its power directly from the motor 42 through the vertical drive shaft 45 which forms part of the rotative drive for the hob 28 and the work blank. To this end, a gear 160 is keyed to the shaft 45 ahead of the clutch 47 (see Fig. 9), and meshes with a gear 161 keyed to the upper end of a vertical shaft 162 projecting into and journaled in the housing 46. The lower end of the shaft 162 is connected through bevel gears 163 and 164, journaled in a gear housing 165 on the left end of the machine base 20, to one end of a horizontal shaft 166 extending along the rear of the base.

The other end of the shaft 166 is connected through a bevel gear 167 to a bevel gear 168, both gears being journaled in a housing 169 similar to the housing 165 on the right end of the machine base 20. A vertical shaft 170 is splined at its lower end for relative axial movement to the bevel gear 168, and is journaled in the upper and lower walls of a gear housing 171 rigidly mounted on the right end of the main carriage 94 for vertical movement therewith. It will be evident that the shaft 170 is driven in one direction at a constant speed.

The upper end of the shaft 170 is connected through a train of change gears 172, 173, 174, 175, 176, and 177 (see Figs. 9, 10 and 11) to a vertical worm shaft 178, the gears 173 and 174 and the gears 175 and 176 being securely keyed respectively to the upper ends of two vertical shafts 179 and 180. To prevent undue back-lash or looseness in the gear train, the shafts 178, 179 and 180 are journaled near both ends in the upper and lower walls of the housing 171. A hinged cover 181 is provided on the housing 171 for enclosing the gear train.

Mounted on the shaft 178 intermediate its ends is a worm 182 in mesh with a worm wheel 183 rotatably journaled on a shaft 184 in turn journaled in the side walls of the housing 171. A clutch element 185 is splined to the shaft 184 for axial movement into and out of coacting engagement with a similar clutch element 186 formed on the left end of the hub of the worm wheel 183.

Any suitable means may be provided for actuating the clutch element 185, and in the present instance this means (see Figs. 13 to 16) comprises a bifurcated shifting element 187 slidably mounted on a fixed rod 188 in the housing 171. The element 187 is formed on its underside with a gear rack 189 which meshes with a gear sector 190 on the inner end of a sleeve 191 suitably journaled in a bearing 192 in the front wall of the housing 171. The sleeve 191 projects from the front of the housing 171, and is provided with a suitable hand lever 193.

Splined for axial movement on the shaft 184 is a gear 194 (see Fig. 4) which is movable selectively into meshing engagement with either of two gears 195 and 196, or into an intermediate neutral position. The gear 195 is secured to a horizontal shaft 197 which is journaled at its ends in the bearing brackets 101 and 102, and which is connected through bevel gears 198 and 199, and 200 and 201 respectively to the screw shaft extensions 99 and 100. In order to permit independent adjustment of the supporting feed screws 97 and 98 for the purpose of leveling the top of the carriage 94, the shaft 197 is divided intermediate its ends. Flanged collars 202 with interfitting serrations are secured to the two abutting ends of the sections of the shaft 197, and are removably bolted together. The gear 196 is secured in the housing 171 to the right end of the feed screw 109 for the hob slide 108.

Any suitable means may be provided for shifting the intermediate gear 194, and in the present instance this means (see Figs. 13 to 16) comprises a yoke 203 slidable on the rod 188. A depending crank arm or lever 204 at its lower end engages in a notch 205 in the top of the yoke 203, and at its upper end is secured to a rocker shaft 206 journaled in the front wall of the housing 171. A suitable hand lever 207 is secured to the outer end of the shaft 206 and is provided with a spring pressed detent 208 for holding it yieldingly in any one of its three positions of adjustment.

It will be evident that upon bringing the clutch elements 185 and 186 into engagement, a slow, powerful feed drive will be connected to the shaft 184 from which it is adapted to be transmitted either through the gears 194 and 195 to the vertical feed screws 97 and 98 to elevate the carriage 94, or through the gears 194 and 196 to the feed screw 109 to feed the hob slide 108 to the left.

Interlock means is provided for preventing the power feed drive from being connected to the shaft 184 unless the clutch 47 in the rotative drive for the work spindle 23 and the hob spindle 128 is closed, and for preventing opening of the clutch 47 unless the power feed drive to the shaft 184 is interrupted. In the present instance, this interlock means (see Fig. 17) is interposed between the actuators for the clutch 47 and the clutch element 185, and comprises the shaft 59, the lower end of which extends into the housing 171, and is formed with an elongated pinion 209. A shifter bar 210 slidably disposed in the housing 171 is formed with a gear rack 211 which meshes with the pinion 209. The bar 210 is formed with a lateral notch 212 adapted to be shifted into or out of the path of a pin 213 projecting from the periphery of the gear sector 190.

It will be evident that when the clutch 47 is open, the pin 213 will prevent actuation of the gear sector 190 to shift the clutch element 185 into engagement with the clutch element 186, and when the clutch 47 is closed, the notch 212 will be positioned in the path of the pin 213 to permit such engagement, and that when such engagement is effected, the pin 213 being in the notch 212 will prevent opening of the clutch 47.

Rapid traverse for hob

A rapid traverse drive is available for selectively moving either the carriage 94 or the hob slide 108 quickly in either direction. This drive (see Figs. 9, 11 and 13) parallels the feed drive from the shaft 170 to the shaft 184, and includes two opposed bevel gears 214 and 215 rotatably mounted on the shaft 170 and formed with opposed end clutch elements 216 and 217. A clutch sleeve 218 is splined to the shaft 170 for movement into engagement with either of the clutch elements 216 and 217, or into intermediate neutral position, and with these elements constitutes a reversing clutch 219 for the rapid traverse.

The means for actuating the clutch 219 comprises a yoke 220 embracing the sleeve 218 and slidably mounted on a fixed rod 221 in the housing 171. The yoke 220 is formed with a vertical gear rack 222 which meshes with a gear sector 223 keyed to a rock shaft 224 journaled in the housing 171. The shaft 224 extends from the front of the housing 171, and is provided with a suitable hand lever 225.

A bevel gear 226 meshes with the opposed bevel gears 214 and 215, and is secured to a horizontal shaft 227 terminating within the front end of the housing 171. The front end of the shaft 227 is formed with a helical gear 228 in mesh with a helical gear 229 rigid with the clutch element 185 on the shaft 184.

Interlock means is provided for preventing the simultaneous institution of the feed and the rapid traverse. This means (see Figs. 10, 11 and 16) comprises a lateral arm 230 integral with the lever 225 and formed with a notch 231 in its free end. A bar 232 pivotally connected to the feed lever 193 carries a depending finger 233 notched in its rear face to define a lug 234. When the rapid traverse lever 225 is in neutral, movement of the feed lever 193 to institute the feed will move the lug 234 into the front end of the notch 231 to lock the lever 225 in position. Conversely, when the feed is disconnected, movement of the rapid traverse lever 225 out of its neutral position to institute the rapid traverse in either direction will move the end of the arm 230 at either side of the notch 231 into the path of the lug 234 to lock the feed lever 193 in position.

*Manual feed for hob*

The carriage 94 and the hob slide 108 may be fed manually upon disconnecting the power feed and the rapid traverse drive. The means for this purpose comprises a shaft 235 journaled in the sleeve 191 and extending therethrough from the front of the machine into the housing 171. A hand wheel 236 is journaled on the front end of the shaft 235, and is adapted to be connected thereto through a clutch 237 normally held in open position by a coil spring 238. The inner end of the shaft 235 is formed with a pinion 239 which meshes with a gear 240 formed on a stub shaft 241 journaled at its ends in the housing 171. A helical gear 242 is formed on the shaft 241, and meshes with the gear 228 from which the power is transmitted through the gear 229 to the shaft 184 as described.

*Automatic traverse stops*

Suitable trip means is provided for limiting the rapid traverse of the hob slide 108 in either direction and also the feed of the hob slide 108 to the left. This means (see Figs. 1 and 3) comprises a pair of similar crank arms 243 and 244 pivotally mounted at their lower ends on a stud 245 threaded into the carriage 94. A substantially horizontal bar 246 extending along the front of the carriage 94 under the overhanging front end of the hob slide 108 is pivotally connected at its left end to the free end of the inner crank arm 243 and at its right end to the free upper end of a crank arm 247 formed integral with the ring 248 freely rotatable on the sleeve 191. The ring 248 also is formed with a second arm 249 extending to the right, and provided with a forwardly extending pin 250 on its free end disposed in the rear end of the notch 231 in the arm 230 on the rapid traverse lever 225. The bar 232 pivotally connected to the feed lever 193 as heretofore described is extended along the front of the carriage 94 in parallel relation to the bar 246, and is pivotally connected at its left end to the free end of the outer crank arm 244.

Securely mounted on the front end of the hob slide 108 and depending therefrom is a trip member 251. A fixed emergency stop 252 is secured to the bar 246 near its left end, and is always in position for engagement by the trip member 251 to effect movement of the bar to the left and therethrough movement of the rapid traverse lever 225 into neutral upon rapid traverse of the hob slide 108 into its extreme left position. Adjustably mounted on the bar 246 are an outer stop 253 and an intermediate stop 254. The stop 253 is always in position for engagement by the trip member 251 to move the bar 246 to the right and therethrough the rapid traverse lever into neutral position upon rapid traverse of the hob slide to the right into a predetermined position. The stop 254 is out of the path of the trip member 251 when the rapid traverse lever is in neutral, but is movable into position for engagement by the trip member upon actuating the rapid traverse lever 225 to institute a rapid traverse of the hob slide 108 to the left.

A single adjustable stop 255 is mounted on the bar 232, and upon engagement by the member 251 is adapted to effect movement of the bar 232 to the left to move the lever 193 into open position to discontinue the feed of the hob slide 94.

I claim as my invention:—

1. A horizontal hobbing machine comprising, in combination, an elongated bed, a headstock column on one end of said bed, a tail end column on the other end of said bed, the adjacent sides of said columns being formed with vertical ways, an elongated carriage mounted on said ways for vertical translation, a pair of vertical feed screws journaled in opposite ends of said carriage and in threaded engagement with said bed for supporting said carriage and for moving said carriage vertically, a cutter spindle adjustably mounted on said carriage for movement from either column to the other, a work spindle mounted for rotation in fixed position on said headstock column, and means for driving said spindles and said feed screws in timed relation.

2. A horizontal hobbing machine comprising, in combination, a base, a pair of spaced columns on said base, a hollow carriage mounted for vertical adjustment between said columns, a pair of feed screws rotatably anchored in opposed ends of said carriage and in threaded engagement with said base for supporting said carriage and for moving said carriage vertically, a horizontal shaft journaled in said carriage and operatively connected to said feed screws, said shaft being separable intermediate its ends to permit relative adjustment of said feed screws, a cutter spindle rotatably mounted on said carriage, a work spindle rotatably mounted on one of said columns over said cutter spindle, and means for driving said spindles and said shaft in timed relation.

3. A horizontal hobbing machine comprising, in combination, a base, a headstock column mounted on said base, a tail end column mounted on said base, a carriage mounted for vertical translation on said columns, a slide mounted for translation on said carriage, a swivel support on said slide, a cross slide on said swivel support, a cutter spindle rotatably mounted on said cross slide, a work spindle mounted on said headstock column, and means for driving said spindles.

4. A horizontal hobbing machine comprising, in combination, a base, spaced columns on said base, a carriage slidably disposed on said columns and supported on said base for vertical translation, a slide mounted for translation on said carriage longitudinally thereof, a swivel support on said slide, a cross slide on said swivel support, a cutter spindle mounted on said cross slide directly over the swivel center of said support, a work spindle rotatably mounted in fixed position on one of said columns, and power means for driving said work spindle and said cutter spindle, the drive connection to said cutter spindle including a power inlet shaft extending along the outside of one side of said carriage.

5. A horizontal hobbing machine comprising, in combination, a base, a column on said base, a carriage slidably disposed on said column for vertical translation, a slide mounted for translation on said carriage, a swivel support on said slide, a cross slide on said swivel support, a cutter spindle mounted on said cross slide directly over the swivel center of said support, a work spindle, and means for driving said spindles.

6. A hobbing machine comprising, in combination, a base, a headstock column on said base, a tail end column on said base, a carriage mounted for vertical translation on said columns, a slide mounted on said carriage, a cutter spindle on said slide, a work spindle on said headstock column, a source of power, means including a clutch connected to said source for driving said spindles in synchronism, said means being mounted partially on said headstock column and partially on said slide and including a transmission shaft extending along the outside of said carriage, means connected to said source for driving said carriage and said slide, said last mentioned means being mounted mainly on the tail end of said carriage and including a feed drive and a rapid traverse drive selectively available respectively through a feed clutch and a reversing clutch, interlock means between said first mentioned clutch and said feed clutch for preventing closing of said feed clutch when said first mentioned clutch is open and opening of said first mentioned clutch when said feed clutch is closed, and interlock means for preventing simultaneous closing of said feed clutch and said reversing clutch.

7. In a hobbing machine, in combination, a support, a cutter slide on said support, a swivel table on said slide, a cross slide on said table, a spindle journaled on said cross slide directly over the center of said swivel table, a slide adjustably mounted on the underside of said cutter slide and formed with a depending housing, a swivel housing mounted on said depending housing, one end of said spindle extending into said swivel housing, a spline power inlet shaft extending along said cutter slide into said depending housing, a vertical shaft in said swivel housing coincident with its swivel axis, gear means in said swivel housing splined to said spindle and connected to said vertical shaft.

8. In a hobbing machine, in combination, a vertical standard, a support mounted on said standard for vertical translation, power means including a vertical spline shaft on said standard, a bracket on said support, a horizontal spline shaft journaled on said bracket and having a drive connection with said vertical shaft, a tool slide on said support movable along said horizontal spline shaft, a slide adjustable on said tool slide along said horizontal spline shaft, a swivel table on said tool slide, a spindle journaled on said table, a swivel housing on said last mentioned slide, a vertical shaft journaled in said housing concentric with the swivel axis and geared to said horizontal spline shaft, said spindle extending into said housing, and gear means in said swivel housing splined to said spindle and connected to said last mentioned vertical shaft.

9. In a hobbing machine, in combination, a support, a tool slide on said support, a swivel table on said slide, a cross slide on said table having closely spaced bosses, a spindle journaled in said bosses directly over the swivel axis of said table, a swivel housing mounted on said tool slide for adjustment therealong, a shaft in said housing concentric with its swivel axis, gear means in said housing splined to said spindle and connecting said spindle to said shaft, and a power inlet shaft mounted along said tool slide and having a spline gear connection with said first mentioned shaft.

10. A hobbing machine comprising, in combination, a frame, a work spindle rotatable on a fixed axis in said frame, a movable support on said frame, a hob spindle on said support, means for adjusting said hob spindle axially and around a swivel axis perpendicular to and intersecting said hob spindle axis, means for driving said work spindle, mechanism carried by said support for driving said hob spindle, and a driving connection for said mechanism from said work spindle-driving means positioned eccentrically of said swivel axis.

JOHN B. SINDERSON.